United States Patent Office 2,849,408
Patented Aug. 26, 1958

2,849,408
CATALYST

Paul F. Bente, Jr., Lewiston, N. Y., assignor to E. I. du Pont de Nemours & Company, Wilmington, Del., a corporation of Delaware No Drawing. Application February 21, 1947
Serial No. 730,187

3 Claims. (Cl. 252—474)

This invention relates to catalyst preparation and, more particularly, it relates to catalysts composed of anodically oxidized lead or metallic cobalt containing an activating coating.

It has been known, prior to this invention, that anodically oxidized lead and electrodeposited cobalt, particularly structures containing an adherent but porous and rough coating of these substances, have considerable utility as catalysts, particularly as catalysts for the decomposition of strong, aqueous solutions of hydrogen peroxide. Anodically oxidized lead catalysts are disclosed and claimed in the copending application of C. J. Wernlund, Serial No. 730,209, filed February 21, 1947, now Patent No. 2,465,773. Electrodeposited cobalt catalysts are disclosed and claimed in the copending application of C. J. Wernlund and P. F. Bente, Jr., Serial No. 730,208, filed February 21, 1947.

Although these previously-known catalysts have considerable utility for the purposes set forth, they have been found to lose catalyst activity upon exposure to the atmosphere. Furthermore, such catalysts have a somewhat low initial activity for decomposition of hydrogen peroxide.

It has now been been found that anodically oxidized lead and electrodeposited cobalt catalysts can be treated to activate the same whereby they will have a greater initial activity and will retain their activity for longer periods of exposure to the atmosphere.

It is, therefore, an object of this invention to provide a new and improved activated catalyst structure.

It is another object of this invention to provide a new and improved method of activating catalysts.

It is still another object of this invention to provide a method of activating anodically oxidized lead and electrodeposited cobalt catalysts.

It is a still further object of this invention to provide a method of activating anodically oxidized lead and electrodeposited cobalt catalysts for use in the decomposition of hydrogen peroxide.

Other objects of this invention will appear hereinafter.

The objects of this invention may be accomplished, in general, by coating the anodically oxidized lead or electrodeposited cobalt catalyst surfaces with a spongy silver deposit. This may be done by immersing the oxidized lead or cobalt catalysts in a silver nitrate solution.

As disclosed in detail in the above-said Wernlund application, anodically oxidized lead catalyst structures may be produced by forming an adherent coating of lead on a metallic supporting structure, for example, an iron screen, and placing the lead-coated structure as the anode in an alkaline electrolytic solution containing a steel cathode and passing an electric current therethrough. The alkaline electrolytic solution is preferably an aqueous solution of sodium or potassium carbonate. The above-mentioned Wernlund and Bente application describes the production of a rough, porous cobalt coating on a metallic supporting structure such as iron or steel screen.

In accordance with this last-mentioned process, the iron or steel screen is made the cathode and with a cobalt structure as the anode, the cobalt is electroplated from an aqueous electrolytic solution containing cobaltous sulfate, ammonium sulfate, and ammonium hydroxide at a preferred pH of 7.3 to 7.6.

In accordance with the preferred procedure of the present invention, the anodically oxidized lead or the rough electrodeposited cobalt catalyst structures are immersed in an aqueous solution containing between 5 and 20 grams per liter of silver nitrate and 20 to 50 milliliters per liter of nitric acid having a specific gravity of 1.42, for a period of one to five seconds. The structures are then removed and dried. Nitric acid is not essential in the solution since a very decided activation of the catalyst for hydrogen peroxide decomposition results by the use of a solution which contains silver nitrate in the absence of nitric acid. The nitric acid is preferred, however, to produce a catalyst which remains active longer and has a higher initial activity, especially at low temperatures.

As an alternative process of applying the activated silver coating, silver nitrate may be added to a small amount, sufficient to cover the catalyst structure, of $H_2O_2$ having a strength of about 40% or more, and the structure dipped into the solution. All of the peroxide will be thus decomposed but the activating coating will thereby be formed on the structure.

Preferably, the activating of the catalysts in the silver nitrate solution or silver nitrate-nitric acid solution is carried out with the solution at room temperature or slightly above, for example, 15° C. to 30° C.

The structures may be dried with a moving current of air or by means of air at an elevated temperature. It is preferred, however, in order to obtain the best results, to dry the silver-coated catalyst structure in still air at about atmospheric temperature.

The preferred form of catalyst structure is one containing a foraminous metal supporting structure having a coating of anodically oxidized lead or rough, porous, electrodeposited cobalt, and an external coating of silver as produced thereon in accordance with this invention. The silver coating is preferably formed on the structure in a comparatively thin layer so as to avoid closing the openings of the foraminous structure. For this reason, and by reason of the fact that the spongy silver deposit forms very rapidly, the immersion in the silver nitrate solution is continued only for a period of a few seconds.

The silver coating appears to impart an activating effect on the anodically oxidized lead catalyst or the electrodeposited cobalt catalyst. The catalytic effectiveness of these materials is greatly enhanced by the spongy silver coating. For example, in the decomposition of aqueous hydrogen peroxide solutions containing 27% to 100% $H_2O_2$, the silver-coated catalysts of this invention will have a much greater initial activity than similar catalysts without a silver coating, particularly at low temperatures, for example, temperatures below —15° C.

The anodically oxidized lead or electrodeposited cobalt catalytic structures need not be immersed in the silver nitrate solution to coat the same with the spongy silver. The solution of silver nitrate or silver nitrate and nitric acid may be applied to the catalyst structures by other means, for example, by brushing, spraying, or the like, whereby a thin coating of silver will form on the surface of the catalyst.

Reference in the specification and claims to parts, proportions and percentages, unless otherwise specified, refers to parts, proportions and percentages by weight.

Since it is obvious that many changes and modifications

What is claimed is:

1. As a catalyst structure suitable for the decomposition of hydrogen peroxide, a metal support, a substance taken from the class consisting of anodically oxidized lead and electrodeposited cobalt adherent to said support, and an activating surface coating of spongy silver on said substance.

2. As a catalyst structure suitable for the decomposition of hydrogen peroxide, a metal support, anodically oxidized lead on said suport, and an activating surface coating of spongy silver on said lead.

3. As a catalyst structure suitable for the decomposition of hydrogen peroxide, a metal support, electrodeposited cobalt on said support, and an activating surface coating of spongy silver on said cobalt.

References Cited in the file of this patent

UNITED STATES PATENTS

| | | |
|---|---|---|
| 2,111,584 | Eversole | Mar. 22, 1938 |
| 2,364,970 | Gwynn | Dec. 12, 1944 |